United States Patent [19]

Vitaloni

[11] 4,255,645

[45] Mar. 10, 1981

[54] ELECTRIC CIGARETTE-LIGHTER DEVICE

[75] Inventor: Alberto Vitaloni, Turin, Italy

[73] Assignee: Squirrel S.p.A., Cambiano, Italy

[21] Appl. No.: 83,716

[22] Filed: Oct. 11, 1979

[30] Foreign Application Priority Data

Mar. 5, 1979 [IT] Italy ............................... 53037/79[U]

[51] Int. Cl.³ ............................................... F23Q 7/22
[52] U.S. Cl. ................................... 219/267; 219/265; 219/270; 361/264
[58] Field of Search ............... 219/260, 261, 262, 263, 219/264, 265, 266, 267, 268, 269, 270, 386, 533; 361/264, 265, 267

[56] References Cited

U.S. PATENT DOCUMENTS

| | | |
|---|---|---|
| 2,014,416 | 9/1935 | Soreng .................................. 219/270 |
| 2,248,409 | 7/1941 | Lehmann .......................... 219/265 X |
| 2,275,922 | 3/1942 | Reyburn ................................ 219/267 |
| 2,528,500 | 11/1950 | Davis .................................... 219/261 |
| 3,356,826 | 12/1967 | Krautwurst et al. ................. 219/267 |
| 3,383,494 | 5/1968 | Hubert .................................. 219/265 |

FOREIGN PATENT DOCUMENTS 346350   4/1931   United Kingdom ..................... 219/267

*Primary Examiner*—Volodymyr Y. Mayewsky
*Attorney, Agent, or Firm*—Sughrue, Rothwell, Mion, Zinn & Macpeak

[57] ABSTRACT

An electrical cigarette-lighter device for mounting on a vehicle dashboard has a fixed hollow body part and a removable elongate candle part normally stowed in the body part. The candle part includes an electrically-energizable burner and a surrounding outer sleeve. To facilitate use of the device, the operative front face of the burner is arranged to face sideways in the sleeve and an access aperture is provided in the sidewall of the sleeve. With such an arrangement of the candle part, a user upon removing the candle part out of the dashboard-mounted body part, will normally only need to turn the candle part through 90° to light a cigarette held between his lips.

10 Claims, 7 Drawing Figures

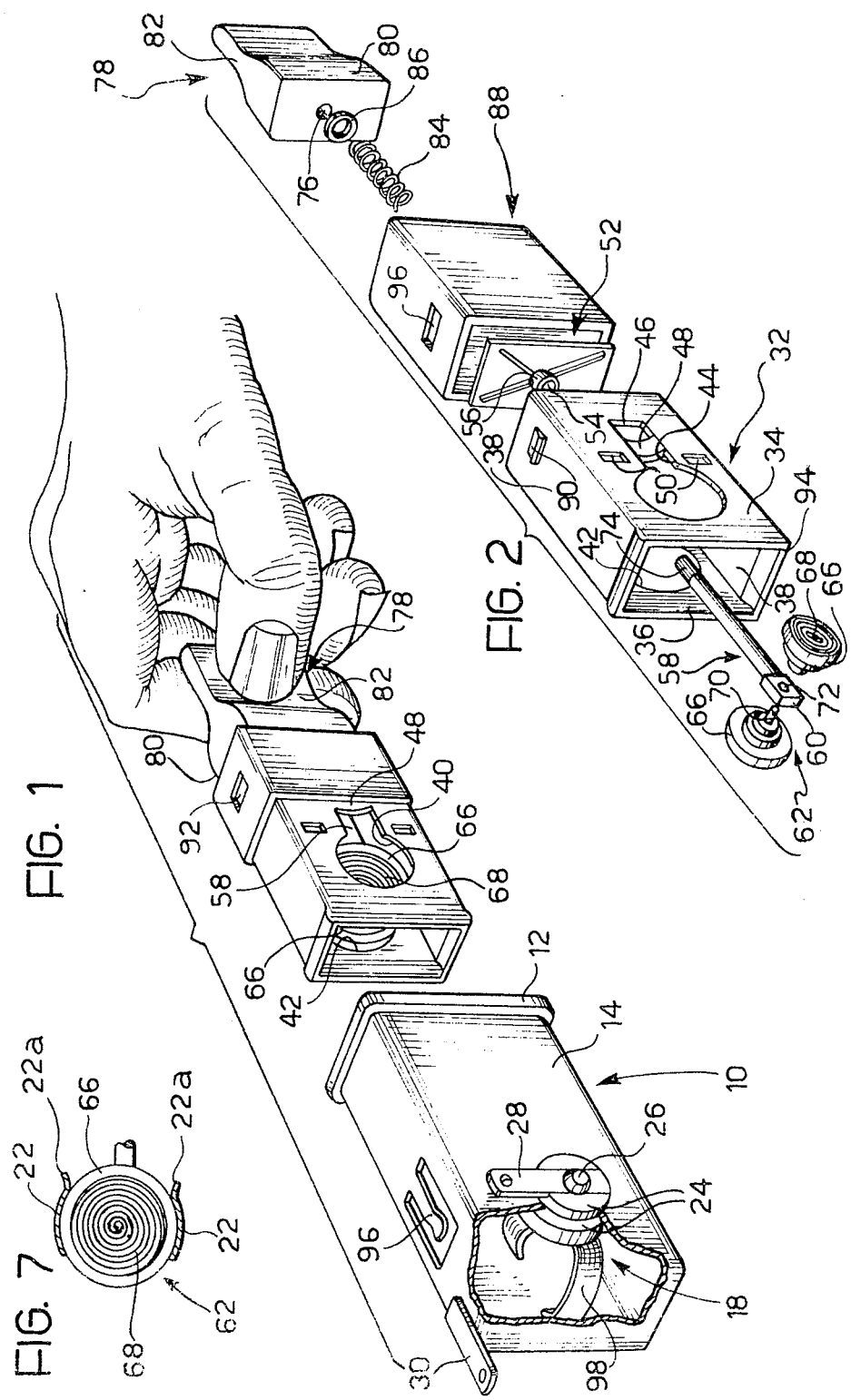

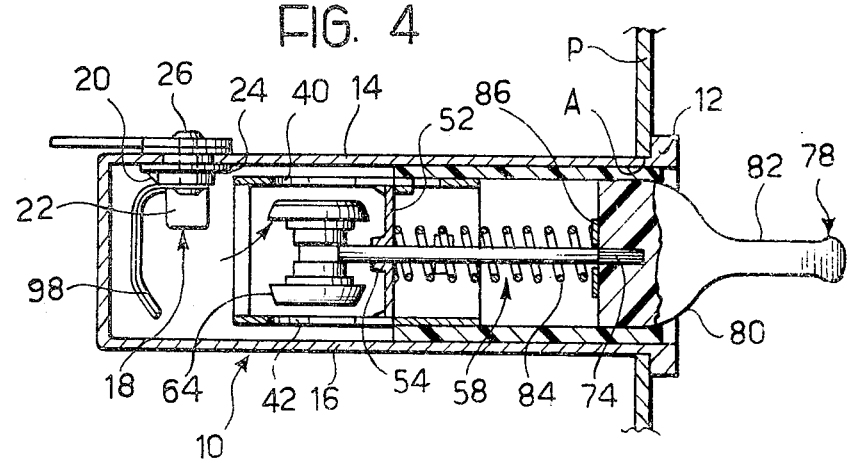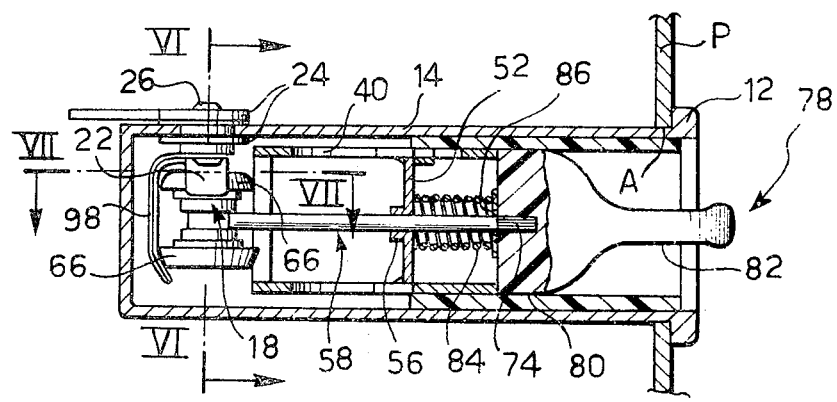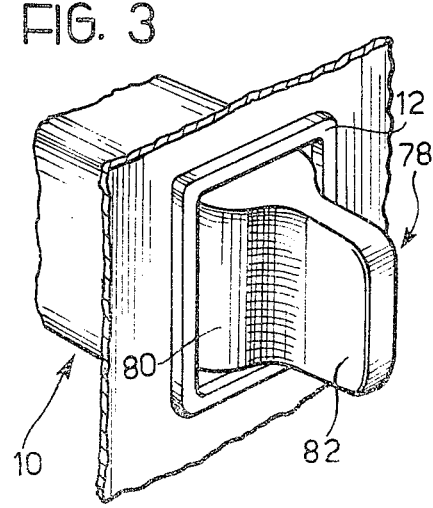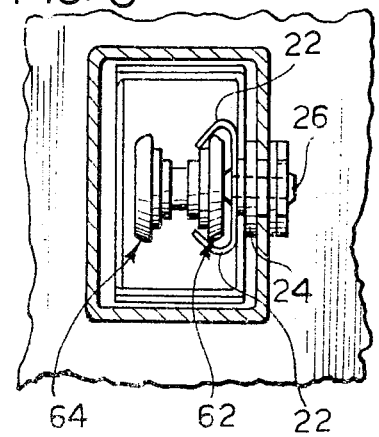

ELECTRIC CIGARETTE-LIGHTER DEVICE

The present invention relates to an electric cigarette lighter device, of the type comprising an elongate hollow support body, open at a first end and supporting internally, close to a second end, a collet comprising a bimetallic lamina shaped substantially in the form of a U and providing a pair of jaws interconnected by a yoke, said yoke being secured to said body and connected to an electrical terminal of the device; an elongate coupling sleeve insertable into the body; a movable assembly slidably mounted within the coupling sleeve and comprising a push-button which, with the coupling sleeve inserted into the body, protrudes from the open end of the body, and a burner in the form of a metal cap containing an electrical resistance element providing a front face for the burner against which a cigarette to be lit can be applied, one end of said resistance element being electrically connected to the cap and the other end being arranged for connection to a second terminal of the device; and biasing means reacting between the coupling sleeve and the movable assembly such that with the coupling sleeve inserted into the body, the biasing means is operative to urge said assembly away from the said second end of the body into a first position in which the burner cap is out of engagement with the jaws of the collet, the movable assembly being displaceable, by pressing of the pushbutton, against the force of the biasing means into a second position in which the periphery of the cap is engaged and held by the jaws of the collet and the resistance element is electrically energised, the heat emitted by the energised resistance element causing the jaws of the collet to heat up and open out thereby freeing the cap and enabling the movable assembly to return to its first position under the urging of said biasing means.

Lighter devices of this type are principally intended for installation in vehicles. Indeed, an electrical lighter device currently forms part of the standard mass-produced equipment of the majority of cars.

In cars, the lighter device is generally installed on the dashboard or instrument-bearing panel, or in a position immediately below the said panel.

All the known lighter devices of the above type have a substantially elongate cylindrical form. The hollow body has a bell-and-spigot form and its second end is closed by a base to which is secured the yoke of the bimetallic collet. The jaws of the latter project towards the open end of the body. The coupling sleeve is also cylindrical and forms the casing of a so-called "candle." In addition, the movable assembly sliding in the coupling sleeve has substantially cylindrical form. The end of this assembly which faces towards the base of the body supports the burner, the front face of which is directed towards the yoke of the collet and towards the base.

Thus in the known lighters of the afore-mentioned type, the white-hot front face of the burner is situated at the end of the "candle." This has the following disadvantage: when the driver of a vehicle picks up the "candle" from the dashboard, the white-hot front face of the burner faces the dashboard. In order to light a cigarette held in the mouth, the driver must rotate the candle through 180°, to turn its white-hot face towards himself. This operation is somewhat inconvenient and may be dangerous when driving.

It is therefore an object of the present invention to provide a lighter device of the afore-mentioned type, the use of which requires a simpler and therefore less dangerous manual operation.

The object of the invention is achieved by means of a device in which the coupling sleeve has at least one aperture in a side wall thereof and the burner is arranged with its front face facing towards this side wall, the yoke of the collet being secured to the said side wall with the two jaws extending transversally inside the body, and the movable assembly being so arranged that in its first position the front face of the burner is situated in correspondence with the aperture, and in the second position of the movable assembly in which the periphery of the cap is engaged and held by the jaws, the front face of the burner faces the yoke of the said collet.

The front face of the burner is thus accessible not at the end of the coupling sleeve, but on one side of the latter. In use of the device, it is only necessary to turn the removable part or "candle" (formed by the coupling sleeve and the movable assembly) through approximately 90° in order to present the white-hot face of the burner to the end of a cigarette held in the user's mouth. The movement of the user's arm is therefore simpler, more convenient and less dangerous than the movement required with previously known devices.

An electric cigarette lighter device embodying the invention will now be particularly described, by way of example, with reference to the accompanying diagrammatic drawings, in which:

FIG. 1 is a perspective view of both a fixed body and a removable part of "candle" of the lighter device;

FIG. 2 is an exploded perspective view of the device;

FIG. 3 is a perspective view of the device with the fixed body mounted in a panel and the "candle" in its normal stowed position;

FIG. 4 is a longitudinal section of the device with the candle in its stowed position;

FIG. 5 is a longitudinal section similar to FIG. 4 but showing the device during a heating up phase of burners of the device;

FIG. 6 is a section on line VI—VI of FIG. 5; and

FIG. 7 is a section on line VII—VII of FIG. 5.

As shown in the drawings, the lighter device comprises a hollow support body 10 of drawn sheet metal. The body 10 is of elongate form and is open at one end. In cross-section the body 10 is of generally rectangular form.

The body 10 is provided at its open end with a peripheral flange 12.

The body 10 is intended to be mounted in a rectangular aperture A (FIG. 4) provided in a wall P which may form part either of an instrument panel or dashboard of a motor vehicle, or of a bracket secured beneath such a panel. The means for securing the body 10 in position have not been shown in the drawings but may be of any suitable type. When installed, the body 10 extends rearwardly from the wall P with its flange 12 abutting against the external face of the wall P. As with known devices, the flange 12 may be surrounded by a luminous ring (not shown).

Preferably, the mounting of the body 10 on the wall P is such that the two walls 14 and 16 of the body 10 which are of the largest area, are vertically orientated. The end of the body 10, remote from the flange 12 (that is, the end situated to the rear of the panel P) is closed. Adjacent the closed end of the body 10 is arranged a collet 18 formed by a bimetallic lamina shaped substantially in the form of a U, so as to comprise a yoke 20 and a pair of spring jaws 22.

The yoke 20 is secured to the wall 14 with the interposition of insulating washers 24, by means of a central rivet 26. The rivet 26 also serves to secure an electrical terminal 28 on the outside of the wall 14 with one of the washers 24 insulating this terminal 28 from the wall 14. The purpose of the terminal 28 is to provide an electrical connection between the positive pole of the battery of the vehicle, and the collet 18.

A second electrical terminal 30 is welded directly onto the outside of the body 10 and is intended for connection to the negative pole of the battery.

Associated with the body 10 is a removable part or so-called "candle" of the device. This part comprises as its principal component a coupling sleeve 32, made of sheet metal and of elongate form. The coupling sleeve 32 has a cross-section of rectangular form the dimensions of which are slightly smaller than those of the corresponding section of the body 10.

The coupling sleeve 32 has two walls 34, 36 of larger area and two walls 38 of smaller area. In the preferred mounting orientation of the device in which the longer sides of the aperture A are vertical, the two larger walls 34, 36 are also orientated vertically when the coupling sleeve 32 is inserted into the body 10. The two walls 34, 36 are provided with respective circular apertures 40, 42. Each of these apertures opens on one side into a substantially rectangular notch 44. The notches 44 are situated on the side of the apertures 40, 42 nearest the end of the coupling sleeve 32 which, when the coupling sleeve 32 is inserted in the body 10, is furthest from the closed end of the body 10. Associated with each notch 44 is a transverse slit 46 extending parallel thereto. Each notch 44 is separated from its associated slit 46 by a transverse bridge 48 of sheet metal which forms part of the corresponding coupling wall 34 or 36.

Each notch 44 is flanked by two tongues 50 which project into the coupling sleeve 32. Each tongue 50 is positioned slightly towards the associated aperture 40 or 42, with respect to the bridges 48. The tongues 50 are made by a stamping operation.

A small sheet-metal plate 52 is arranged within the coupling sleeve 32 and has an outline form corresponding to that of the internal section of the said coupling sleeve 32. During assembly of the device, the small plate 52 is inserted into the coupling sleeve (from the right as viewed in FIGS. 3, 4 and 5) until it is brought up against the edges of the tongues 50. Subsequently, the bridges 48 are bent inwards by means of a suitable implement, so that they assume the configuration shown in FIG. 2. In this manner, the small plate 52 is clasped and firmly held between the tongues 50 and the bridges 48, and forms a transverse baffle inside the coupling sleeve 32.

The small plate or baffle 52 has a central aperture 54 defined by a bush portion 56 of the plate. A rod 58 is slidingly mounted in the aperture 54 to extend longitudinally of the coupling sleeve 32.

The end of the rod 58 which is nearest the closed end of the body 10 when the coupling sleeve 32 is inserted in the body 10, carries a centrally-apertured square plate 60. The plate 60 has two principal faces which face towards respective ones of the walls 34, 36. Mounted on each of these principal faces is a respective burner 62, 64, these burners being arranged back to back. Each burner 62, 64 is of a conventional type which comprises a cap 66 with a profiled peripheral rim. Each cap 66 contains a spiral electrical resistance coil 68 of a known type, the radially outer end of which is electrically connected to the said cap and the central end of which is electrically connected to a central core member insulated from the rest of the cap. The two core members are interconnected by a threaded stud 70 which extends through an aperture 72 formed centrally in the plate 60 and which serves to secure the two burners 62, 64 in position on opposite sides of the plate 60. The radially-inner end of each burner coil is electrically connected to the rod 58 via its associated core member, the threaded stud 70 and the plate 60.

A ceramic insulating washer 74 is interposed between each cap 66 and the plate 60 in order to electrically insulate each cap from the metal rod 58.

The mounting of the burners 62, 64, on the rod 58 is such that the front faces of the two resistance coils 68 face towards respective ones of the walls 34 and 36 of the coupling sleeve 32. These front faces of the coils 68 serve to provided white-hot surfaces for the lighting of a cigarette during operation of the lighter device.

As previously mentioned, the rod 58 is slidably mounted in the aperture 54 of the baffle bush portion 56. This arrangement not only serves to guide sliding movement of the rod 58 longitudinally of the coupling sleeve 32 and of the body 10, but also ensures a good electrical contact between the rod 58 and the small plate or baffle 52. The baffle 52 itself makes good electrical contact with the coupling sleeve 32 of sheet metal.

The end 74 of the rod 58 situated on the opposite side of the baffle 52 to the burners 62, 64 (that is, to the right of the baffle 52 as viewed in FIGS. 2, 4 and 5) is knurled and is force-fitted into a blind hole 76 formed in a pushbutton 78.

The pushbutton 78 is made of a moulded plastic material, and has a base portion 80. The base portion 80 has a rectangular cross-section substantially corresponding to that of the coupling sleeve 32. The base portion 80 of the pushbutton 78 merges into a flatter front portion 82, the shape of which is designed to facilitate the pushbutton 78 being grasped by hand in the manner shown in FIG. 7.

A helical compression spring 84 reacts at one end against the baffle 52 and at its other end against the base portion 80 of the pushbutton 78. A washer 86 is interposed between the spring 84 and the base portion 80. The spring 84 is operative to urge the movable assembly comprising the pushbutton 78, the rod 58 and the burners 62, and 64, to move relative to the coupling sleeve 32 in a direction which with the coupling sleeve inserted in the body 10, corresponds to movement of the assembly outwards from the body 10 away from its closed end.

Associated with the coupling sleeve 32 is a sheath 88 of a rigid plastics material. The sheath 88 has a substantially rectangular cross-section. The coupling sleeve 32 is inserted part way into the sheath 88, which projects towards the pushbutton 78. Each of the two smaller walls 38 of the coupling sleeve 32 has an outwardly-projecting tongue 90, formed by means of a stamping operation. The two tongues 90 are snapped into corresponding holes 92 of the sheath 88 and serve to hold the sheath 88 fast with the coupling sleeve 32. The inside faces of the sheath 88 form by their cooperation with the base portion 80 of the pushbutton 78 a guide for sliding motion of the pushbutton 78. The outside faces of the sheath 88 form a guide for sliding of the coupling sleeve 32 in the body 10.

The coupling sleeve 32, the sheath 88, and the movable assembly including the pushbutton 78 and burners 62 and 64, together form a so-called "candle" which may be inserted into the body 10, through its open end.

In FIG. 4 the "candle" is shown inserted in the body 10 in a normal stowage position where it is retained by the snap engagement of two inwardly-projecting spring tongues 96 (FIG. 1) of the body 10 over an enlarged rim 94 (FIG. 2) provided around the innermost end of the coupling sleeve 32.

This snap engagement of the spring tongues 96 over the rim 94 prevents the "candle" from falling out of the body 10 under the effect of vibrations and jolts experienced during the running of the vehicle.

With the "candle" in its normal stowage position (FIG. 4) the spring 84 is effective to cause the whole of the front portion 82 of the pushbutton 78 to protrude out of the sheath 88 and beyond the flange 12 of the body 10. The movable assembly including the two burners 62, 64 is situated in a first position in which each of the burners is aligned with a respective one of the apertures 40 and 42.

When it is desired to use the lighter device, the pushbutton 78 is pressed inwards, against the force of the spring 84, causing the entire movable assembly to enter further into the body 10, by sliding in the coupling sleeve 32. In this manner the movable assembly is moved into a second position (FIG. 5) in which the two burners 62, 64 are situated in correspondence with the collet 18. In this position of the burners, the periphery of the cap 66 of the burner 62 is engaged and held by the spring jaws 22 of the collet 18. The spring jaws 22 have a concave profile which corresponds to the circular profile of the cap 66, as shown in FIG. 7. Preferably, each jaw 22 has a turned-back leading edge portion 22a which facilitates the insertion of the cap 66 between the jaws 22. The retaining force exerted on the movable assembly by the jaws 22 when cold is arranged to be sufficient to counteract the outward biasing force provided by the compressed spring 84.

In the second position of the movable assembly (FIG. 5), the periphery of the cap 66 of the burner 64 engages a spring strip 98 secured to the yoke 20 of the collet 18 by means of the said rivet 26. The spring strip 98 serves to provide an electrical connection between the positive pole of the vehicle battery and the cap 66 of the burner 64.

Electrical connection of the central ends of the two resistance coils 68 to the negative pole of the vehicle battery, is provided for by the electrical contact made between the coupling sleeve 32 and the body 10 and in particular through the engagement of the rim 94 with the spring tongues 96.

Thus with the movable assembly in its second position, the two resistance coils 68 are electrically connected across the vehicle battery and heat up through red heat. The heat radiating from the resistance coil 68 of the burner 62 causes the yoke 20 of the collet 18 to heat up with the result that the two bimetallic jaws 22 open out, freeing the burner 62 and therefore the entire movable assembly which thereupon returns to its first position under the effect of the spring 84.

The user then grasps the pushbutton 78 in the manner shown in FIG. 1 and removes the "candle" from the body 10. The white hot front faces of the two resistance coils 68 are now accessible through the apertures 40 and 42 and either resistance coil may be used to light a cigarette.

In a left-hand drive motor-vehicle, the driver normally grasps the pushbutton 78 with the right hand, and it will therefore be easy, with a rotation of the arm through 90°, to bring the left-hand white hot burner into contact with the cigarette to be lit. The passenger seated next to the driver will normally use his or her left hand to grasp the pushbutton 78, and it will therefore be more convenient for him, with a similar rotation of the left arm, to light a cigarette using the right-hand burner.

Various modifications of the described lighter device are of course possible. Thus, for example the lighter device might be produced without the second burner 64 and the corresponding aperture 42. In this case, the preferred arrangement of the installed device is that in which the wall of the coupling sleeve provided with the burner access aperture is turned upwards when the coupling sleeve is inserted in the fixed body. With this arrangement, when the user takes out the "candle" he can see just by glancing down whether the burner is properly lit. Furthermore, even in the embodiment with a single burner, the user is only required to rotate his arm through substantially approximately 90°, which is a simpler action than that required with conventional lighter devices.

We claim:

1. An electrical cigarette-lighter device, of the type comprising:

an elongate hollow support body, open at a first end and supporting internally, close to a second end, a collet comprising a bimetallic lamina shaped substantially in the form of a U and providing a pair of jaws interconnected by a yoke, said yoke being secured to said body, two electrical terminals supported on said body, a first one of said terminals being electrically connected to said yoke, an elongate coupling sleeve insertable into the body, a movable assembly slidably mounted within the coupling sleeve and comprising a push-button which, with the coupling sleeve inserted into the body, protrudes from the open end of the body, and a burner in the form of a metal cap containing an electrical resistance element providing a front face for the burner against which a cigarette to be lit can be applied, one end of said resistance element being electrically connected to the cap and the other end being arranged for connection to a second one of said electrical terminals, and biasing means reacting between the coupling sleeve and the movable assembly such that with the coupling sleeve inserted into the body, the biasing means is operative to urge said assembly away from the said second end of the body into a first position in which the burner cap is out of engagement with the jaws of the collet, the movable assembly being displaceable, by pressing of the pushbutton, against the force of the biasing means into a second position in which the periphery of the cap is engaged and held by the jaws of the collet and the resistance element is electrically energised, the heat emitted by the energised resistance element causing the jaws of the collet to heat up and open out thereby freeing the cap and enabling the movable assembly to return to its first position under the urging of said biasing means, characterised in that, the coupling sleeve has a sidewall defining at least one aperture and the burner is arranged with its front facing towards this side wall, the yoke of the collet being secured to the said side wall with the two jaws extending transversally inside the body, and the movable assembly being so arranged that in its first position the front face of the burner is situated in correspondence with the aperture, and in the second position of the movable assembly in which the periphery of the cap is engaged and held by the jaws, the front face of the burner faces the yoke of the said collet.

2. A lighter device according to claim 1, wherein the movable assembly comprises a second burner including a cap and having a front face which faces oppositely to that of the first-mentioned burner, said coupling sleeve defining second side-wall aperture in correspondence to the location of the front face of the second burner when the movable assembly is in its first position, the device including electrical connection means for effecting an electrical connection between the collet and the cap of the second burner when the movable assembly is in its second position.

3. A lighter device according to claim 1, wherein the movable assembly comprises a rod to one end of which is secured said pushbutton and to the other end of which is secured said burner, the coupling sleeve being provided with an internal transverse baffle defining a guiding aperture through which the rod passes, and the said biasing means comprising a helical compression spring which encompasses the rod and reacts at one end against the baffle and at the other end against the pushbutton.

4. A lighter device according to claim 3, wherein said aperture is defined by a bush portion of the said baffle.

5. A lighter device according to claim 3, wherein the body, the coupling sleeve and its internal baffle are made of sheet metal and the rod is a metal rod, electrical connection between said second terminal and said resistance element being established by metal-metal contact between the body and the coupling sleeve and between the baffle and the rod.

6. A lighter device according to claim 5, wherein the baffle comprises a small plate of sheet metal held in the coupling sleeve due to its interposition between parts of the latter bent towards the inside.

7. A lighter device according to claim 5, wherein coupling sleeve externally supports, at its end nearest the pushbutton, a sheath of rigid plastic material, the external faces of the sheath being arranged to co-operate with the body to form a guide for the insertion of the coupling sleeve into the body, and the internal faces of the sheath being arranged to co-operate with the pushbutton to form a guide for sliding movement thereof.

8. A lighter device according to claim 5, wherein the end of the coupling sleeve nearest the said second end of the body when inserted therein has an enlarged rim and said body is formed with inwardly-projecting spring tongues, said tongues being arranged to snap engage with said rim to hold the coupling sleeve firmly in an inserted position within the body.

9. A lighter device according to claim 1, wherein the body and the coupling sleeve, are of rectangular cross-section with the said aperture being provided in one the larger walls of the coupling sleeve.

10. A lighter device according to claim 9 wherein the push button has a base portion of rectangular cross-section, said sheath being of corresponding cross-section.

* * * * *